United States Patent [19]
Tanigawa et al.

[11] 3,779,525
[45] Dec. 18, 1973

[54] GAS-LIQUID CONTACTING APPARATUS

[75] Inventors: Shogo Tanigawa; Takesi Yokoyama, both of Tamano; Kouichi Karakawa, Toyama, all of Japan

[73] Assignee: Mitsui Shipbuilding and Engineering Co. Ltd., Tokyo, Japan

[22] Filed: Aug. 19, 1971

[21] Appl. No.: 173,080

[52] U.S. Cl. .............................. 261/114 R, 55/257
[51] Int. Cl. .............................................. B01d 3/26
[58] Field of Search ............ 261/113, 114 R, 114 A, 261/114 VT, 114 JP; 55/223, 240, 255–257

[56] References Cited
UNITED STATES PATENTS

| | | |
|---|---|---|
| 410,634 | 9/1889 | Bolton .............................. 261/114 R |
| 2,778,621 | 1/1957 | Zimmerman, Jr. .............. 261/114 A |
| 2,819,049 | 1/1958 | Manning, Jr. et al. .......... 261/114 A |
| 3,633,882 | 1/1972 | Karakawa et al. ............... 261/114 R |
| 3,693,948 | 9/1972 | Kloss ................................ 261/114 A |

Primary Examiner—Tim R. Miles
Assistant Examiner—Steven H. Markowitz
Attorney—Dexter N. Shaw et al.

[57] ABSTRACT

A gas-liquid contacting apparatus provided with vertically spaced trays having gas flow aperture therein and a contacting structure provided on the trays surrounding the gas flow aperture. The contacting structure has a cover for preventing gas and liquid to ascending and a perforated plate for breaking gas and liquid mixing flow therein.

3 Claims, 5 Drawing Figures

GAS-LIQUID CONTACTING APPARATUS

The present invention relates to a gas-liquid contacting apparatus for heat or mass transfer such as distillation apparatus or absorption apparatus in the chemical industry.

An object of the present invention is to provide a gas-liquid contacting apparatus which has high contacting efficiency despite of simple construction.

To this end, the gas-liquid contacting apparatus in accordance with the present invention comprises a gas-liquid contacting structure surrounding a gas flow opening provided on the tray and a perforated breaking plate is provided in the structure.

Figure 1:
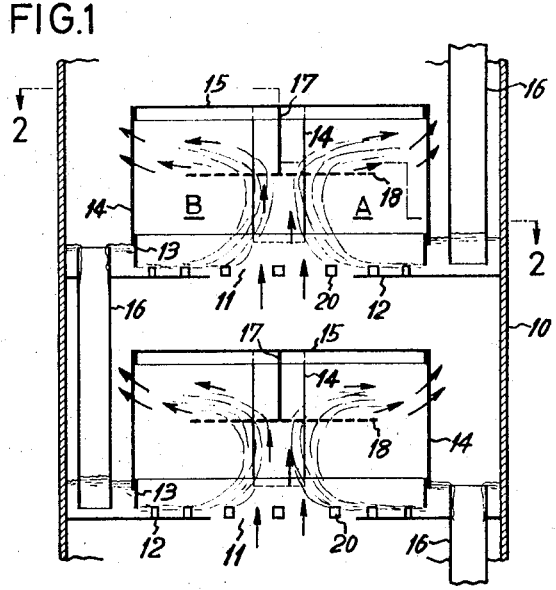
FIG. 1 is a vertical sectional view of one embodiment of the present invention.
Figure 2:
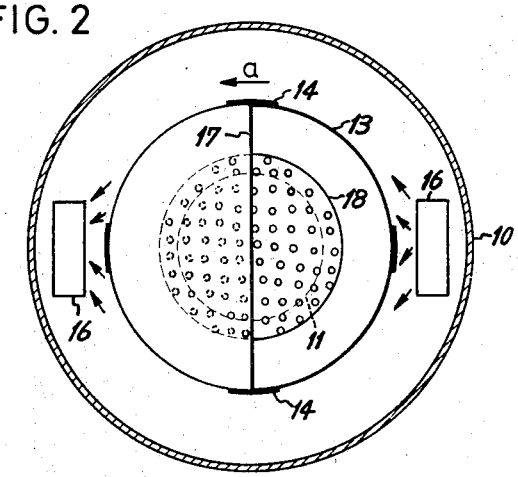
FIG. 2 is a sectional view taken on line 2—2 in FIG. 1.

Referring to the drawings and particulary to FIGS. 1 and 2, trays 12 each having an aperture 11 at a central portion thereof are provided in a column 10 at a suitable space. Each tray 12 is provided with a gas-liquid contacting structure. The gas-liquid contacting structure comprises a cylindrical weir plate 13 surrounding the aperture 11 and having a plurality of slots 20 adjacent the tray 12, and a cover 15 supported on the weir plate 13 by stays 14. Each tray 12 is also provided with a downcomer 16 at the outside of the structure, the downcomer projecting upwardly from the tray to maintain liquid thereon at a predetermined depth, and the lower end of the downcomer being near the lower tray. Each downcomer is arranged in alternately diametrically opposite position at every tray. In the gas-liquid contacting structure, a partition plate 17 is provided at a righ angle with the flowing direction of the liquid on the tray indicated by the arrow "a" in FIG. 2. A perforated breaking plate 18 is secured to the lower end of the partition plate.

Liquid on the tray 12 overflows the weir formed by the downcomer 16 and flows down along the inside wall therof. Liquid is maintained on the tray at a level determined by height of the weir, passes through the slots 20 of the cylindrical weir plate 13 to the inside of the contacting structure and flows toward the aperture 11 of the tray by the head of liquid on the tray. Liquid having passed over the edge of the aperture 11 is blown up by ascending gas through the aperture without falling down through the aperture. Thus the liquid and gas are formed into the gas-liquid mixing flow. The gas-liquid mixing flow ascends through the perforated plate 18 by which the flow is broken or scattered. Further the ascending flow is diverted by the cover 15. Thereby the gas-liquid mixing flow flows from the structure. Liquid separated from the flow falls on the pool maintained on the tray and gas ascends to the next upper contacting structure.

The partition plate 17 divides the room in the structure into A and B, the liquid separated in the room A can not flow into the room B owing the partition plate. Thus the liquid fallen from the room A on the pool flows in the direction of the arrow "a," enters into the room B and contacts again with the gas in the room. Thereafter the liquid flows from the room B and down through the downcomer 16. It will be observed that the gas-liquid mixing flow is broken or scattered by the perforated plate 18 so that the contacting area of the liquid with gas is increased and thereby contacting effect is enhanced.

Figure 3:
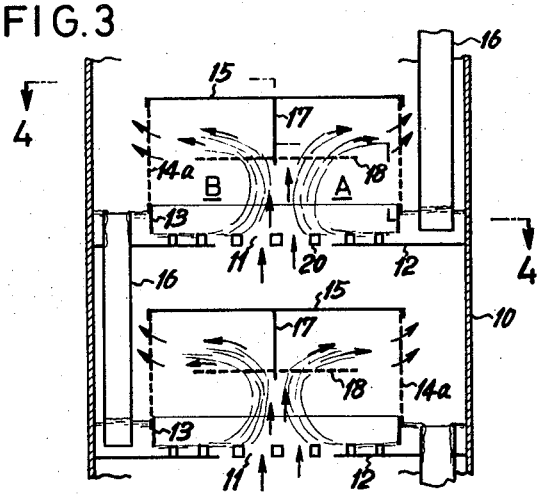
FIG. 3 is a vertical sectional view showing another embodiment of the present invention.
Figure 4:
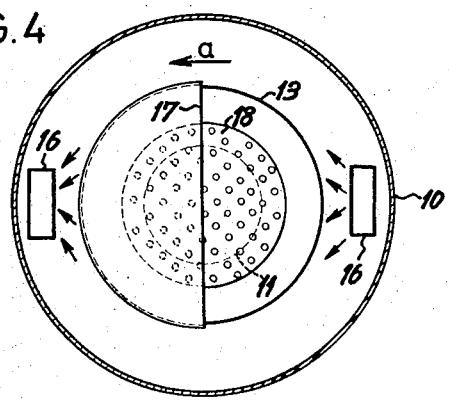
FIG. 4 is a sectional view taken on line 4—4 in FIG. 3.

The gas-liquid contacting structure in the apparatus shown in FIGS. 3 and 4 comprises a perforated cylinder 14a instead of the stays 14 in previously described embodiment. Other parts thereof are identical with that of previous embodiment, and duplicate reference characters being used to identify similar parts. This apparatus has more effective gas-liquid contact than previous embodiment, because the perforated cylinder 14a is employed to form the gas-liquid contacting structure and thereby gas and liquid being remained in the structure for longer period than previous embodiment.

Figure 5:
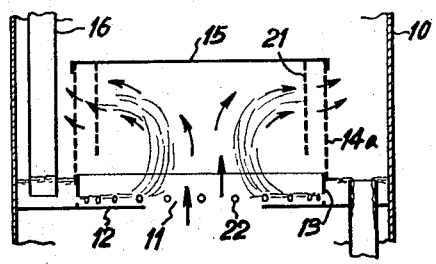
FIG. 5 is a vertical sectional view showing a further another embodiment of the present invention.

The gas-liquid contacting structure shown in FIG. 5 has a perforated cylinder 21 as breaking plate. This apparatus has a plurality of perforations 22 instead of slots 20 shown in FIG. 1 and is not provided with the partition plate 17 in FIG. 1. It will be observed that this apparatus has similar advantages to that of above described apparatus.

We claim:

1. A gas-liquid contacting apparatus comprising an upright column in which the gas flows upwardly, at least one tray mounted transversely in said column and having means for maintaining liquid thereon at a predetermined depth and a gas-flow opening therein, upwardly through which the gas is adapted to flow, contacting structure surrounding said opening comprising a wall projecting upwardly from said tray and having apertures at a lower position below said predetermined depth of liquid to permit discharge of the liquid from the tray therethrough, a perforated plate disposed horizontally above the predetermined depth of liquid on said tray and overlying said gas-flow opening in said tray to permit gas flow therethrough, said structure being designed so that the liquid from said tray discharged through said apertures is blown up by the gas ascending through the gas-flow opening of the tray, the desired gas-liquid contact being effected below said perforated plate above said gas-flow opening, and a cover above said perforated plate to prevent gas and liquid passing through said plate from ascending.

2. A gas-liquid contacting apparatus according to claim 1 including a vertical partition disposed over said gas-flow opening between said perforated plate and said cover.

3. A gas-liquid contacting apparatus according to claim 2 including a series of trays mounted transversely in said column in vertically-spaced relation, said means for maintaining the liquid at a predetermined level upon each tray including downcomer means to transfer liquid from an upper tray to the next lower tray and arranged so that the gas does not flow upwardly through said downcomer means, said downcomer means for the next lower tray being positioned at the opposite side of the column from the downcomer means for the upper tray, whereby the liquid is directed to flow across said tray from said upper downcomer means to said next downcomer means, said vertical partition being disposed transversely to said flow.

* * * * *

UNITED STATES PATENT OFFICE
CERTIFICATE OF CORRECTION

Patent No. 3,779,525            Dated    December 18, 1973

Inventor(s)   Shogo Tanigawa et al

It is certified that error appears in the above-identified patent and that said Letters Patent are hereby corrected as shown below:

In the heading before [52] U.S. Cl., the following should be added:

[30] Foreign Application Priority Data

August 21, 1970     Japan..........83721/1970
        August 24, 1970     Japan..........84104/1970

Signed and sealed this 6th day of August 1974.

(SEAL)
Attest:

McCOY M. GIBSON, JR.                 C. MARSHALL DANN
Attesting Officer                    Commissioner of Patents